2,831,752

SYNTHESIS OF HYDROGEN CYANIDE WITH A COMBINATION CATALYST BODY EMPLOYING GAUZE AND GRANULAR MATERIAL

George W. Luckey, Victoria, Tex., and James M. Robinett and Alvin B. Stiles, Charleston, W. Va., assignors to E. I. du Pont de Nemours and Company, Wilmington, Del., a corporation of Delaware No Drawing. Aplication September 17, 1954
Serial No. 456,874

3 Claims. (Cl. 23—151)

This invention relates to a catalyst which may be used for the synthesis of hydrogen cyanide and, more particularly, it relates to a combination catalyst body employing gauze and granular material designed to give improved operation in the synthesis of hydrogen cyanide.

Several methods are presently known for the preparation of hydrogen cyanide, the more widely accepted methods utilizing a mixture of a nitrogen-containing gas, such as ammonia, a hydrocarbon, and oxygen-containing gas. Of the many varieties of reactants which may fit these specifications a desirable combination of reactants is ammonia, natural gas, and air.

Along with the variety of reactants which may be combined to form hydrogen cyanide commercial processes have taken many different directions in the type of catalyst which is employed in this reaction. Although the catalyst is generally some form of platinum or one of its alloys, the physical shape of the catalyst which has been employed has been a wire gauze, metallic particles, and metallic coatings on various inert substrates. One of the most desired procedures has been to employ naturally occurring beryl (beryllium aluminum silicate) in a granular form and coated with platinum or a platinum alloy. Such a process is described in the Merrill and Perry Patent U. S. 2,478,875.

When a mixture of ammonia, natural gas, and air is passed over a catalyst comprising beryl coated with an 80% platinum/20% rhodium alloy, the yield of hydrogen cyanide from ammonia, as observed over many days of continuous operation, may reach a peak shortly after the beginning of operation and thereafter fall off over a period of several days until it is no longer economical to continue with the catalyst in its spent condition. Accordingly, the reaction is normally stopped at some predetermined low level of yield and the spent catalyst is replaced with new catalyst or is activated so that when operations are renewed the yield of hydrogen cyanide will again be at a high level.

It is an object of this invention to provide a combination catalyst body which is capable of producing a higher yield of hydrogen cyanide from ammonia and of sustaining that high yield over a longer period of time than has been realized by employing any other known catalyst for this process. It is another object of this invention to employ a combination catalyst body comprising metallic gauze and a bed of granular particles coated with a catalytic metal in the process of synthesizing hydrogen cyanide from a mixture of ammonia, natural gas, and air. It is another object of this invention to employ a platinum alloy gauze on the upstream side of a deactivated catalyst bed of granular beryl coated with a platinum alloy to reactivate the granular catalyst bed and continue the synthesis of hydrogen cyanide at a high yield. It is still another object of this invention to activate new, and never before used, platinum-containing gauze by placing it downstream in a catalyst bed with respect to an active sheet of such gauze. Other objects will become apparent from the more detailed description of the invention which follows.

The above objects of this invention are accomplished in the process for synthesizing hydrogen cyanide from a mixture of ammonia, natural gas, and air by passing such a mixture over a catalyst comprising at least one metallic gauze superimposed on a granular refractory material covered with a metallic coating, the metallic gauze and the metallic coating comprising at least 50% by weight of platinum. In the preferred embodiment of this invention the catalyst comprises at least one previously activated gauze superimposed on at least one new gauze which is to be activated and which, in turn, is superimposed on a bed of coated granular beryl, the gauzes and the coating being an alloy of platinum and rhodium containing from about 80 to 90% platinum and 20 to 10% rhodium.

This invention may be illustrated by the several examples which follow in which parts and percentages are by weight unless otherwise specified.

*Example 1.*—A converter was charged with a catalyst containing about 7% by weight of an 80% platinum/20% rhodium alloy forming a continuous coating on the surface of finely divided beryl (6 to 10 mesh). A mixture of ammonia, natural gas, and air in the approximate volume ratio of 1:2:10 was then passed in contact with this catalyst. The reaction was initiated by contacting the catalyst with a small wire loop electrically heated to a temperature above about 900° C. The yield of hydrogen cyanide from ammonia was about 64 to 65% at the beginning of the run, passing through a peak of about 67% and dropped back to about the initial yield of 65% in the first 7 to 8 days of the run, continued at a yield of about 64 to 62% over the next 20 days and then dropped to a yield of about 57% at about 30 days total operating time at which point the reaction was stopped. The catalyst at the end of this time was considered to be spent or deactivated and according to practice known prior to this invention the catalyst would be reactivated by the replacement of 15 to 20% of the used catalyst bed with new catalyst material.

*Example 2.*—The converter was charged with a catalyst bed made of 6 sheets of 90% platinum/10% rhodium gauze separated by ¼" layers of 6 to 10 mesh porcelain chips. Reactant gases in the same ratio as described in Example 1 were then passed in contact with this catalyst. The highest yield of hydrogen cyanide from ammonia obtained by this catalyst was 60% and the general pattern of the change of this yield with respect to elapsed operation time was the same as that described in Example 1 except that it was at a lower level. After about 30 days of continuous operation, the yield had decreased to about 53 to 54% and the reaction was stopped at this time.

*Example 3.*—The spent catalyst bed dscribed in Example 1 which had been used for about 30 days and produced a yield of about 57% of ammonia to hydrogen cyanide was placed in a converter and a single sheet of 90% platinum/10% rhodium gauze was laid on top of the catalyst bed. The reactant gases in the same ratio as described in Example 1 were then passed in contact with this combination catalyst. The initial yield of hydrogen cyanide from ammonia was about 68% and this yield decreased with the elapse of time at such a slow rate that even after more than 40 days the yield was in excess of 60%.

*Example 4.*—A single sheet of 90% platinum/10% rhodium gauze laid over the top of a new granular catalyst bed similar to that described in Example 1 except that the alloy coating is 90% platinum/10% rhodium was charged into a converter. The amount of precious metal in the gauze plus that in the coating on the granular material was approximately the same quantity as that employed in the granular catalyst of Example 1 or the gauze catalyst of Example 2. The same reactant gases and the same ratios as described in Example 1 were then passed over this catalyst. The activity of the catalyst bed increased over the first 2 or 3 days of operation to a value of about 70% yield of hydrogen cyanide from ammonia. This high yield of about 70% continued for several days and finally decreased gradually over a period of about 60 days to about 62%.

*Example 5.*—In a run similar to that described in Example 4 the converter was shut down after the entire catalyst bed had become active as evidenced by a high yield of hydrogen cyanide from ammonia. Several sheets of new gauze were then placed under the sheet of active gauze which was already in the converter. The process was started up again and operated until the entire bed was completely active, as evidenced by a uniform candescence throughout the entire combination catalyst body, this resumption of activity requiring somewhat less than 3 hours. The converter was shut down a second time and the new sheets of gauze were removed for use at a later time.

Without the treatment described in Example 5 new gauzes may require 1 to 4 days to become sufficiently activated in the hydrogen cyanide synthesis to produce the high yields which have been described in the preceding examples. The treatment described in Example 5 permits such gauzes to become activated in a matter of hours and thus permitting a converter to produce a high yield of hydrogen cyanide in a short time after the beginning of a new cycle of operation employing a new, already activated, gauze. Essentially complete activation of the catalyst gauze occurs probably during the first half-hour of operation, although it is not feasible to shut down a converter before the end of about the first 3 hours. The maximum length of time that the unactivated gauze should remain in the converter depends upon its position in the catalyst bed. If the unactivated gauze is placed adjacent to another gauze, they may become welded together after about 30 hours in operation, and furthermore, they may lose weight after the manner of the activated gauze and become physically weak and not able to be handled without breaking or disintegrating. If the new gauze is separated from other gauzes by layers of refractory material or layers of the granular catalyst employed as part of the combination catalyst body, the new gauze may remain in place longer than about 30 hours without the danger of becoming welded to another gauze, but it may lose weight and become physically weak as described above. The preferred time during which the new gauze is left in the combination catalyst body is from about 3 to about 30 hours.

It is not known what causes the increased activity and the corresponding higher yield of desired product by combining a catalytic gauze with a granular catalyst bed in this process, although a synergistic effect is observed. It is known that catalyst metal whether it be in a gauze or as a coating on granular material gradually disappears after many hours of operation in this process. Whether this disappearance is due to erosion, volatilization, or sublimation is not known. It has been observed, however, that in the process of this invention the gauze on the upstream side of the catalyst bed gradually loses weight and the granular material making up the remainder of the catalyst bed gradually gains weight. Furthermore, the granular catalyst material in addition to gaining weight increases its surface area by approximately 100%. Although it might be expected that the gauze catalyst would disappear by volatilization or other means, it is totally unexpected that this metal will appear again in the downstream operation of the bed since the entire bed is at the same temperature according to pyrometric measurements and since the converter is operated substantially under adiabatic conditions.

Whatever may be the reasons for the superiority of the catalyst of this invention, there is a synergistic effect obtained by forming a combination catalyst body of catalytic gauzes and granular refractory material coated with catalytic metal. At least 68%, and usually about 70%, of the ammonia is converted to hydrogen cyanide by this process, and furthermore the useful life of the catalyst is at least about 60 days. Example 1 shows the effect obtained by employing the coated granular catalyst alone (a yield of 65% to 57% over 30 days of life). Example 2 shows the effect of using gauze catalyst in the same process (a yield of 60% to 53% over 30 days of life). Example 4 illustrates the synergism obtained by employing the combination catalyst body of this invention, granular catalyst plus an overlayer of a single sheet of gauze (a yield of 70% to 62% over at least 60 days of life). This effect in Example 4 was obtained employing approximately the same amount of catalyst metal (platinum-rhodium alloy) and the same reactant gas supply as in Example 1 or Example 2. The effect of this synergism therefore is to produce a higher yield than either of the other two catalysts could reach, maintain this higher yield for a long period of time, and have a useful life which is approximately 100% greater than that of either of the other two systems.

The combination catalyst body of this invention is not limited by the number of gauzes employed, the exact structure and size of the granular material, or the exact composition of the catalytic metal. In normal practices, the granular material is about 6 to 10 mesh and is formed into a bed in the converter about ¾ to about 1½" thick and the overlayer comprises a single gauze. More than one gauze may be employed as an overlayer and the catalyst bed may be of any desired mesh size and have any desired thickness of bed. The granular material is preferably naturally occurring beryl (beryllium aluminum silicate) although in certain embodiments of this process such inert refractory materials as silica, porcelain, alumina, and the like, may be employed by those skilled in the art.

The catalytic metal used as a coating on the granular material and also employed in the gauzes may be platinum or any of several mixtures or alloys of at least 50% platinum. A preferred alloy is one containing 80 to 90% platinum and 20 to 10% rhodium.

The reactant mixture which is preferred for the synthesis of hydrogen cyanide is a mixture of ammonia, natural gas, and air. It is to be understood, however, that the process of this invention may be employed with mixtures of nitric oxide and hydrocarbons; ammonia, methane, and oxygen; and other mixtures of gases comprising nitrogen compounds, oxygen, and carbon compounds, including hydrocarbons and carbon oxides.

Another reaction which may be carried out in the presence of the combination catalyst body of this invention is the oxidation of ammonia to nitric acid. Other reactions in which this combination catalyst body may be employed will be apparent to those skilled in the art.

We claim:

1. The process for synthesizing hydrogen cyanide comprising forming a gaseous mixture of ammonia, natural gas, and air, passing said mixture through a fixed catalyst bed, maintained at a high temperature and comprising at least one metallic gauze forming an overlayer covering the upstream surface of a bed of granular refractory material, each granule of which is covered with a continuous metallic coating, the metal in said gauze and said coating comprising at least 50% by weight of platinum, said process being further characterized in that the conversion of ammonia to hydrogen cyanide is greater than 60% over a period of at least 60 days of continuous operation.

2. The process of synthesizing hydrogen cyanide comprising forming a gaseous feed mixture of ammonia, natural gas, and air in a volume ratio of about 1:2:10, respectively, passing said mixture at a high temperature through a fixed catalyst bed comprising at least one gauze, made of an alloy of 80%–90% platinum and 20%–10% rhodium, said gauze being in contact with, and resting upon, the entire upstream surface of a bed of natural beryl particles, sized in the range of 6–10 mesh, each particle having a continuous coating of an alloy of 80%–90% platinum and 20%–10% rhodium, and continuously recovering a product containing hydrogen cyanide in an amount equivalent to at least 60% of the ammonia in said gaseous feed mixture.

3. The process of activating a gauze of platinum alloy for future use as a gauze catalyst in the process of claim 1 for the synthesis of hydrogen cyanide comprising placing a new, unused, unactivated gauze of platinum alloy within the boundaries of the fixed catalyst bed of claim 1 and downstream from the metallic gauze overlayer of said catalyst bed, operating the process of claim 1 for a period of 3 to 30 hours while said unactivated gauze is present within the boundaries of said fixed catalyst bed, and thereafter removing from the catalyst bed said new gauze in an activated state.

References Cited in the file of this patent

UNITED STATES PATENTS

| | | |
|---|---|---|
| 2,368,381 | Schmitt | Jan. 30, 1945 |
| 2,381,344 | Green | Aug. 7, 1945 |
| 2,721,788 | Schad | Oct. 25, 1955 |
| 2,726,931 | Stiles | Dec. 13, 1955 |

FOREIGN PATENTS

| | | |
|---|---|---|
| 685,744 | Great Britain | Jan. 7, 1953 |